(12) United States Patent
Beitelmal

(10) Patent No.: US 10,724,758 B2
(45) Date of Patent: Jul. 28, 2020

(54) HEAT INDEX THERMOSTAT

(71) Applicant: QATAR FOUNDATION FOR EDUCATION, SCIENCE AND COMMUNITY DEVELOPMENT, Doha (QA)

(72) Inventor: Abdlmonem H. Beitelmal, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 335 days.

(21) Appl. No.: 15/828,193

(22) Filed: Nov. 30, 2017

(65) Prior Publication Data
US 2018/0156487 A1 Jun. 7, 2018

Related U.S. Application Data

(60) Provisional application No. 62/429,707, filed on Dec. 2, 2016.

(51) Int. Cl.
*F24F 11/00* (2018.01)
*F24F 11/64* (2018.01)
(Continued)

(52) U.S. Cl.
CPC .............. *F24F 11/64* (2018.01); *F24F 11/30* (2018.01); *F24F 11/50* (2018.01); *F24F 11/523* (2018.01);
(Continued)

(58) Field of Classification Search
CPC .......... F24F 11/64; F24F 11/523; F24F 11/80; F24F 11/63; F24F 11/50; F24F 11/65;
(Continued)

(56) References Cited

U.S. PATENT DOCUMENTS 4,289,272 A   9/1981  Murase
4,890,666 A   1/1990  Clark
(Continued)

FOREIGN PATENT DOCUMENTS

FR   3030695 A1   6/2016
GB   2501765      6/2013
KR   20160034488  3/2016

OTHER PUBLICATIONS

"Wi-Fi Programmable Touchscreen Thermostat + Free App", www.homedepot.com/p/Honeywell-Wi-Fi-Programmable-Touchscreen, printed from Internet Jun. 8, 2016, 2 pages.
(Continued)

*Primary Examiner* — Mohammad Ali
*Assistant Examiner* — Vincent W Chang
(74) *Attorney, Agent, or Firm* — Richard C. Litman; Nath, Goldberg & Meyer

(57) ABSTRACT

The heat index thermostat is an electronic, programmable thermostat having a microcontroller or microprocessor programmed to regulate the temperature of an enclosed space, such as a room or building. The thermostat has a user interface that permits the user to select a mode of operation and to enter a set temperature, and input terminals for receiving signals from relative humidity, indoor temperature, and other sensors. In a heat index mode of operation, the temperature is regulated by reference to a lookup table based on a heat index equation. The microcontroller uses the table inversely by using the set temperature as the heat index temperature, looking up the room temperature that would result in that heat index temperature given the measured relative humidity in the room. The thermostat then turns the cooling/heating unit on or off until the measured room temperature is equal to the temperature determined from the lookup table.

14 Claims, 8 Drawing Sheets

(51) Int. Cl.
  *F24F 11/30* (2018.01)
  *F24F 11/50* (2018.01)
  *F24F 11/523* (2018.01)
  *F24F 11/56* (2018.01)
  *F24F 11/80* (2018.01)
  *F24F 11/65* (2018.01)
  *G05B 15/02* (2006.01)
  *F24F 11/63* (2018.01)
  *G05D 23/19* (2006.01)
  *F24F 110/20* (2018.01)
  *F24F 110/10* (2018.01)

(52) U.S. Cl.
  CPC .............. *F24F 11/56* (2018.01); *F24F 11/63* (2018.01); *F24F 11/65* (2018.01); *F24F 11/80* (2018.01); *G05B 15/02* (2013.01); *G05D 23/1917* (2013.01); *F24F 2110/10* (2018.01); *F24F 2110/20* (2018.01)

(58) Field of Classification Search
  CPC ........... F24F 11/30; F24F 11/56; G05B 15/02; G05B 23/1917
  See application file for complete search history.

(56) References Cited

U.S. PATENT DOCUMENTS

| | | |
|---|---|---|
| 8,374,725 B1 | 2/2013 | Ols |
| 2001/0001927 A1* | 5/2001 | Jackson, Jr. ............ G01W 1/17 73/335.02 |
| 2010/0211224 A1 | 8/2010 | Keeling et al. |
| 2014/0262196 A1 | 9/2014 | Frank et al. |
| 2015/0058779 A1 | 2/2015 | Bruck et al. |
| 2016/0040903 A1 | 2/2016 | Emmons et al. |
| 2016/0123617 A1 | 5/2016 | Vega |
| 2018/0238565 A1* | 8/2018 | Keber .................... F24D 13/02 |

OTHER PUBLICATIONS

NOAA/National Weather Service, "The Heat Index Equation", www.wpc.ncep.noaa.gov/html/heatindex_equation.shtml, printed from Internet Dec. 2, 2016. 2 pages.

Anderson et al., "Methods to Calculate the Heat Index as an Exposure Metric in Environmental Health Research", Environmental Health Perspectives, vol. 121, Iss. 10 (2013), 9 pages.

* cited by examiner

HEAT INDEX THERMOSTAT

CROSS-REFERENCE TO RELATED APPLICATION

This application claims the benefit of U.S. Provisional Patent Application Ser. No. 62/429,707, filed Dec. 2, 2016.

BACKGROUND

1. Technical Field

The present subject matter relates generally to heating, ventilation, and air conditioning (HVAC) technology, and particularly relates to a heat index thermostat.

2. Description of the Related Art

Many commercial and residential buildings utilize HVAC systems to maintain the temperature of the building or the temperature of particular zones in the building. Within the HVAC system, a thermostat is the component that senses the temperature of the heating and/or cooling system in order to maintain the temperature of the system at a desired set point. The thermostat may exert control by switching the heating or cooling systems on or off in order to maintain the temperature.

Thermostat technology has advanced from mechanical thermostats to electrical and analog thermostats to digital electronic thermostats. With further advances in technology, programmable and smart thermostats are available for commercial and residential building automation to control the heating and/or air conditioning. Such thermostats may use a default program or a user-customized program to provide an energy savings. However, there is a constant drive to achieve improved efficiency of HVAC systems, resulting in cost savings and energy savings. Thus, a heat index thermostat solving the aforementioned problems is desired.

SUMMARY

The heat index thermostat is an electronic, programmable thermostat having a microcontroller or microprocessor programmed to regulate the temperature of an enclosed space, such as a room or building. The thermostat has a user interface that permits the user to select a mode of operation and to enter a set temperature, and input terminals for receiving signals from relative humidity, indoor temperature, and other sensors. In a heat index mode of operation, the space temperature is regulated by reference to a lookup table, correlation, heat index calculator or a relationship derived or based on a heat index chart. The microcontroller may use the lookup table or any method described above in combination with the measured indoor relative humidity and indoor temperature to display the current index on the user interface, and on the assumption that the user desires the temperature to feel like the set temperature, uses the table inversely by using the set temperature as the heat index temperature, looking up the room temperature that would result in that heat index temperature given the measured relative humidity in the room. The thermostat then manages the cooling/heating unit on or off or by any other control means until the measured room temperature is equal to the heat index temperature determined from the lookup table or by any other method described above. (It will be understood that temperatures, as used herein, may be in metric or English units or both, since the chart is available in both units.)

The heat index thermostat may have multiple modes of operation. Thus, in some embodiments, the user may set the heat index thermostat to operate in an external temperature mode, called a fixed energy efficiency mode. In this mode, the microcontroller receives an input signal from an external or outdoor temperature sensor. If the external temperature is above a predetermined threshold temperature ($T_{Threshold}$), the microcontroller turns on the air conditioner and sets the thermostat to a cooler temperature according to a gradually increasing range of measured external temperatures. In another mode of operation designed to equalize temperature distribution in a multi-room building, the microcontroller receives measurements of the temperature in each room and continuously adjusts the vent opening so that the temperature in the rooms is substantially the same in all rooms ±2° C.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The heat index thermostat is an electronic, programmable thermostat having a microcontroller or microprocessor programmed to regulate the temperature of an enclosed space, such as a room or building. The thermostat has a user interface that permits the user to select a mode of operation and to enter a set temperature, and input terminals for receiving signals from relative humidity, indoor temperature, and other sensors. In a heat index mode of operation, the space temperature is regulated by reference to a lookup table, correlation, heat index calculator or a relationship derived or based on a heat index chart. The microcontroller may use the lookup table or by any method described above in combination with the measured indoor relative humidity and indoor temperature to display the current index on the user interface, and on the assumption that the user desires the temperature to feel like the set temperature, uses the table inversely by using the set temperature as the heat index temperature, looking up the room temperature that would result in that heat index temperature given the measured relative humidity in the room. The thermostat then manages the cooling/heating unit by turning it on or off or by any other control means until the measured room temperature is equal to the heat index temperature determined from the lookup table or by any other method described above.

The heat index thermostat may have multiple modes of operation. Thus, in some embodiments, the user may set the heat index thermostat to operate in an external temperature mode, called a fixed energy efficiency mode. In this mode, the microcontroller receives an input signal from an external or outdoor temperature sensor. If the external temperature is above a predetermined threshold temperature ($T_{Threshold}$), the microcontroller turns on the air conditioner and sets the thermostat to a cooler temperature according to a gradually increasing range of measured external temperatures. In another mode of operation designed to equalize temperature distribution in a multi-room building, the microcontroller receives measurements of the temperature in each room and continuously adjusts the vent opening so that the temperature in the rooms is substantially the same in all rooms ±2° C.

Figure 7:
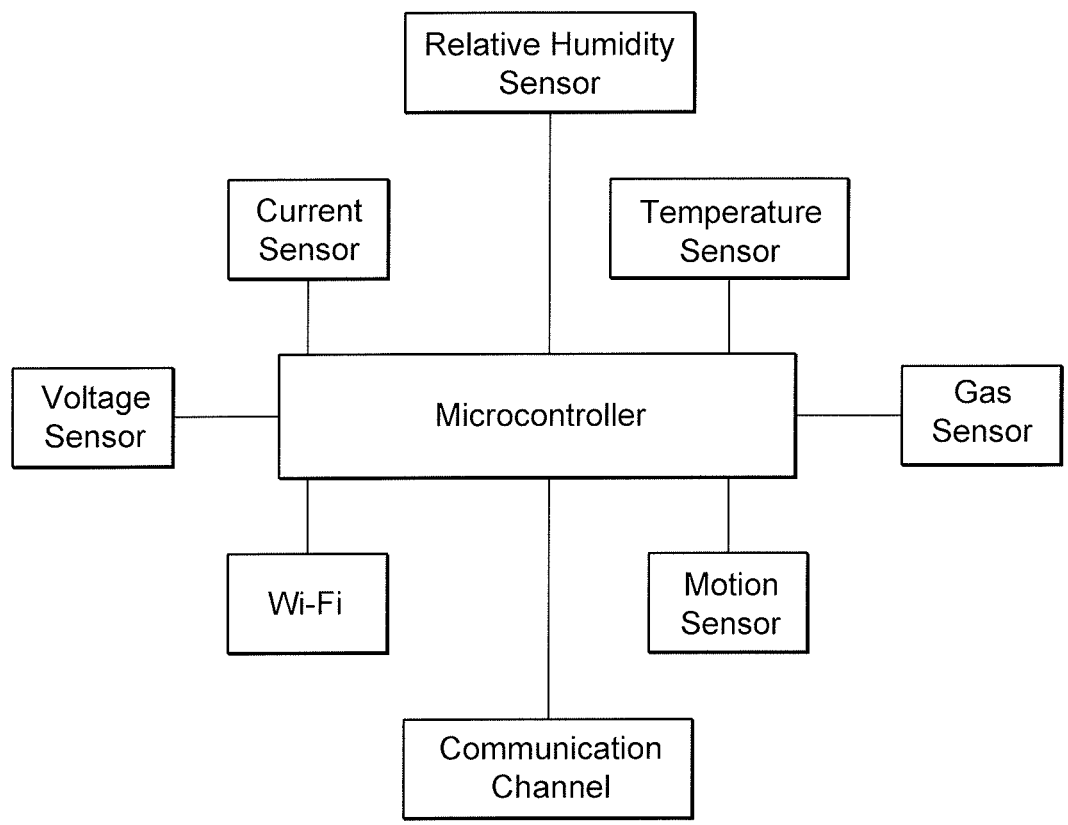
FIG. 7 is a block diagram showing the inputs and outputs for a microcontroller of a heat index thermostat.

FIG. 7 shows an exemplary microcontroller according to the present subject matter. The microcontroller may have several inputs and outputs. For instance, a voltage sensor and a current sensor may input to the microcontroller to calculate power usage and energy efficiency coefficient of performance (COP) for the heating/cooling device, such as an air conditioner, heat pump, or heater. Further, a relative humidity sensor, a temperature sensor, a gas sensor, and a motion sensor may be connected at the thermostat platform, or modules may be distributed inside the building. The microcontroller may also have inputs/outputs for WIFI and communication channels, which depends on the system. For example, a relay for on/off functions could be a low level of communication available.

Figure 8:
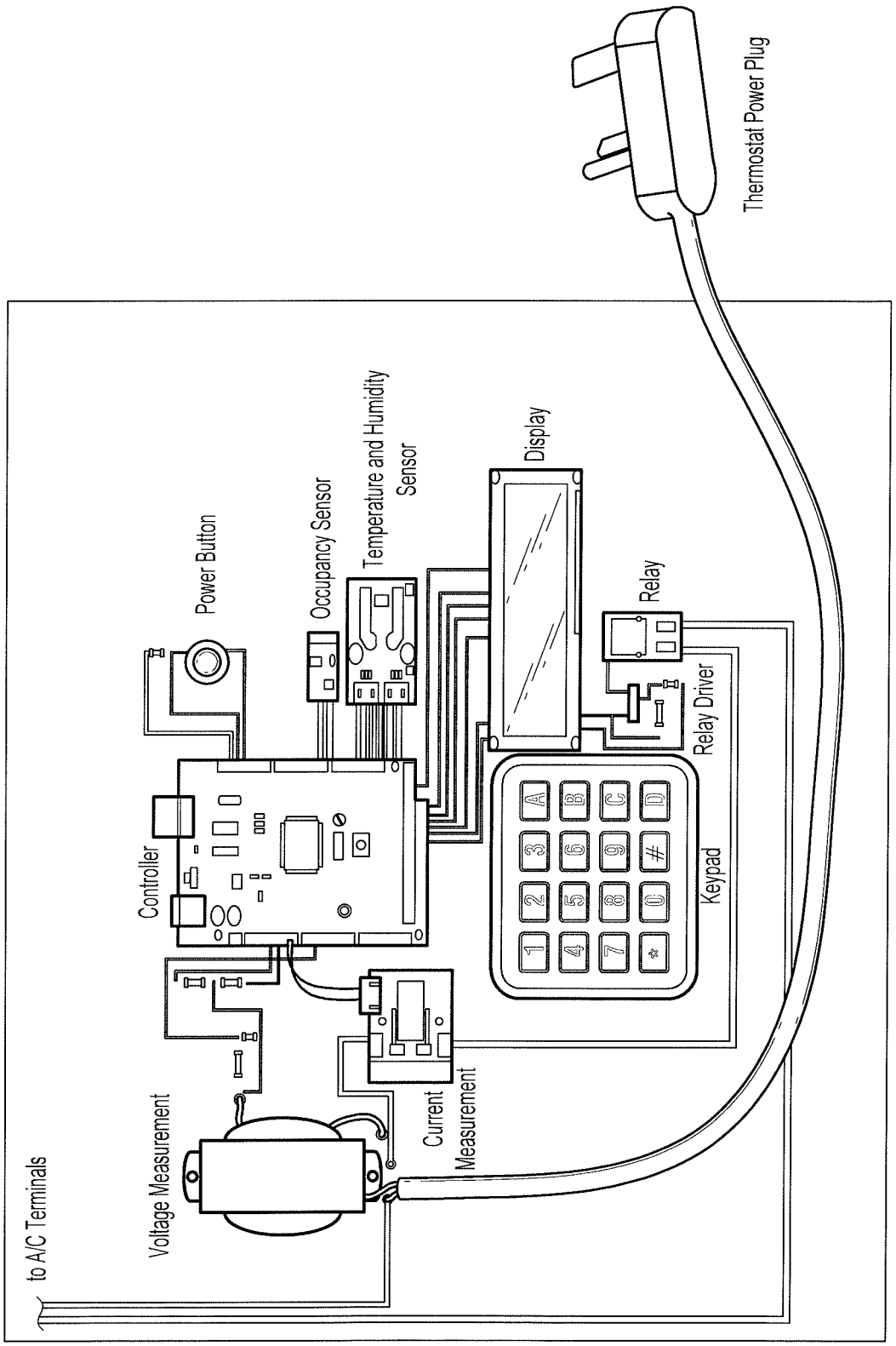
FIG. 8 shows an exemplary embodiment of a heat index thermostat.

In addition, FIG. 8 shows an exemplary embodiment of a heat index thermostat. In FIG. 8, the thermostat has a controller communicating with a power button, voltage measurement, current measurement, occupancy sensor, temperature and humidity sensor, and a screen. Other sensors and inputs may provide additional information, but are not shown in the present embodiment. The display shown in FIG. 8 is a screen and has an associated keypad, but the display may be a touchscreen display. Furthermore, the screen communicates with a relay driver, which communicates with a relay. The relay then communicates with the heating/cooling device or device driver terminals. Furthermore, the voltage measurement communicates with the heating/cooling device terminals to determine voltage used. The embodiment of the thermostat shown in FIG. 8 has a power plug, but may be powered by other sources, for example, battery powered.

The heat index thermostat is used to control a cooling device or heating device (such as an AC unit, wall heater, or a heat pump, which may do either) based upon both a desired temperature set point and measured indoor relative humidity. The cooling device or heating device may be an air conditioner or heating unit. The heat index thermostat, which is also a smart thermostat, controls the cooling device or heating device and also displays information. Sensors and manual inputs are used to provide information. For example, the information may include external temperature, temperature minimum, temperature maximum, external relative humidity, and internal relative humidity, among others. The thermostat may calculate various parameters, including, e.g., percent load, maximum temperature difference, and heat index temperature, and the temperature set-point may be calculated. The measured internal relative humidity (RH) and the occupant selected set-point temperature are used to calculate a more reasonable set-point value. Other features may be included, such as a WIFI connection for remote monitoring and control. Additionally, there may be other inputs to the system, such as a camera, a motion sensor, a voltage sensor, and a current sensor, among others.

A user initially sets a mode of operation for the heat index thermostat using the user interface. In the heat index mode of operation, the user inputs a desired temperature value, as with a conventional thermostat. The thermostat assembly computes indoor temperature and indoor relative humidity from sensor input, or obtains the data directly from the input signal, depending on the sensor's capability. A heat index lookup table, correlation or relationship calculator stored in the computer readable memory provides the heat index temperature in the space to be temperature-controlled based on the measured indoor temperature and measured indoor relative humidity. The lookup table or any other method described above may also be used inversely, assuming that the temperature set by the user is the temperature that the user wants the indoor temperature to feel. Thus, the thermostat's processor assumes the set temperature is the desired indoor heat index temperature and uses the chart to determine the indoor temperature that would produce the desired indoor heat index temperature given the measured/calculated indoor relative humidity. The heat index thermostat then thermostatically controls a cooling device or heating device to produce that indoor temperature, turning the heating/cooling device on and off until the measured heat index temperature is equal to the temperature set by the user.

Figure 1:
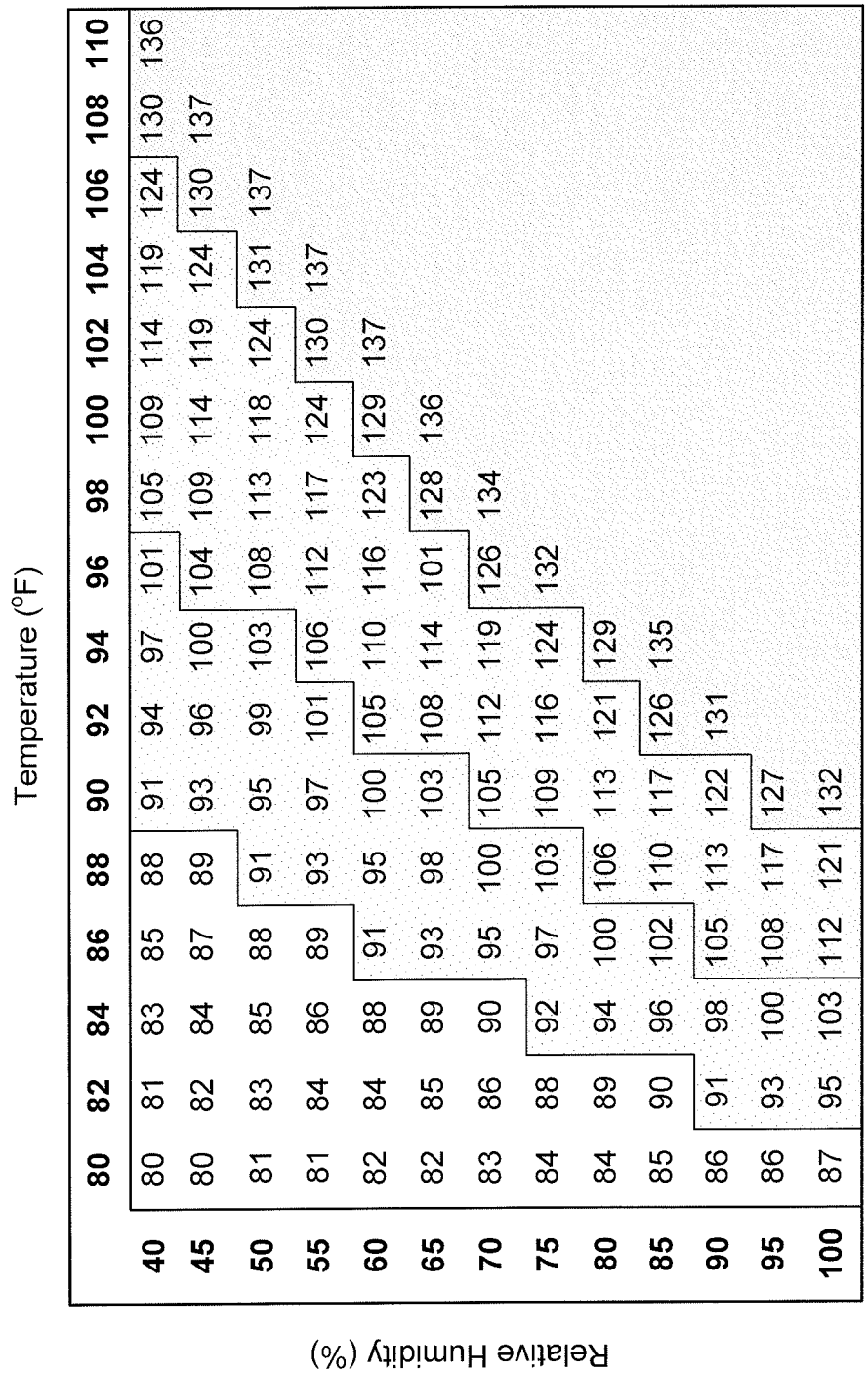
FIG. 1 shows an exemplary heat index lookup table providing the heat index as a function of indoor temperature (° F.; although the units in the particular lookup table in FIG. 1 are expresses in ° F., it will be understood that the same table is available with the temperatures expressed in metric units [° C.]) and relative humidity (%), which can be used inversely by the heat index thermostat to regulate cooling/heating units to the indoor temperature that would provide a heat index temperature equal to the temperature set by the user.

FIG. 1 shows an exemplary heat index lookup table based on relative humidity (%) and temperature (° F.). It will be understood that the lookup table in FIG. 1 is only exemplary. The lookup table may be based on any heat index equation known in the art. A commonly used heat index equation is the regression equation of Rothfusz, described in the U.S. National Weather Service's 1990 Technical Attachment (SR 90-23). However, there are other heat index equations or relationships that can be developed for this purpose. It has been estimated that there are at least twenty-one separate heat index algorithms used in environmental research (see Anderson et al., "Methods to Calculate the Heat Index as an Exposure Metric in Environmental Health Research", Environmental Health Perspectives, Vol. 121, Iss. 10 (2013). While the various equations may be too inconsistent for rigorous scientific research, generally any one of these algorithms may produce an acceptable lookup table for use in the present heat index thermostat, and the choice of heat index equation may be influenced by the environment in the region of the world in which the heat index thermostat is to be used and the relative success of the heat index equation in producing acceptable results in that region of the world.

The heat index thermostat may include a thermostat housing and a thermostat assembly disposed in the thermostat housing, the thermostat assembly having a user interface for entering a desired temperature setting (e.g., a keypad or keyboard, a touch screen, a dial, etc.), the user interface also having a display screen; means for computing or storing indoor relative humidity in a space to be temperature-controlled upon receipt of a signal from a relative humidity sensor (a microprocessor and/or microcontroller and memory); means for computing or storing indoor temperature in the space to be temperature-controlled upon receipt of a signal from a temperature sensor (a microprocessor and/or microcontroller and memory); means for determining a measured heat index in the space to be temperature-controlled based on the measured indoor temperature and the measured indoor relative humidity (as an example, the lookup table stored in memory); means for determining an adjusted temperature setting based on the relative humidity, indoor temperature, heat index, and user set temperature; and an actuator for actuating a cooling device and/or heating device to the adjusted temperature setting and thermostatically controlling the cooling device or heating device to maintain the measured heat index at the desired temperature setting (a microcontroller/processor and load circuit).

The thermostat assembly may further comprise a wireless transceiver configured to utilize a WIFI network to receive and transmit commands in order to remotely monitor and control the heat index thermostat.

Figure 2:
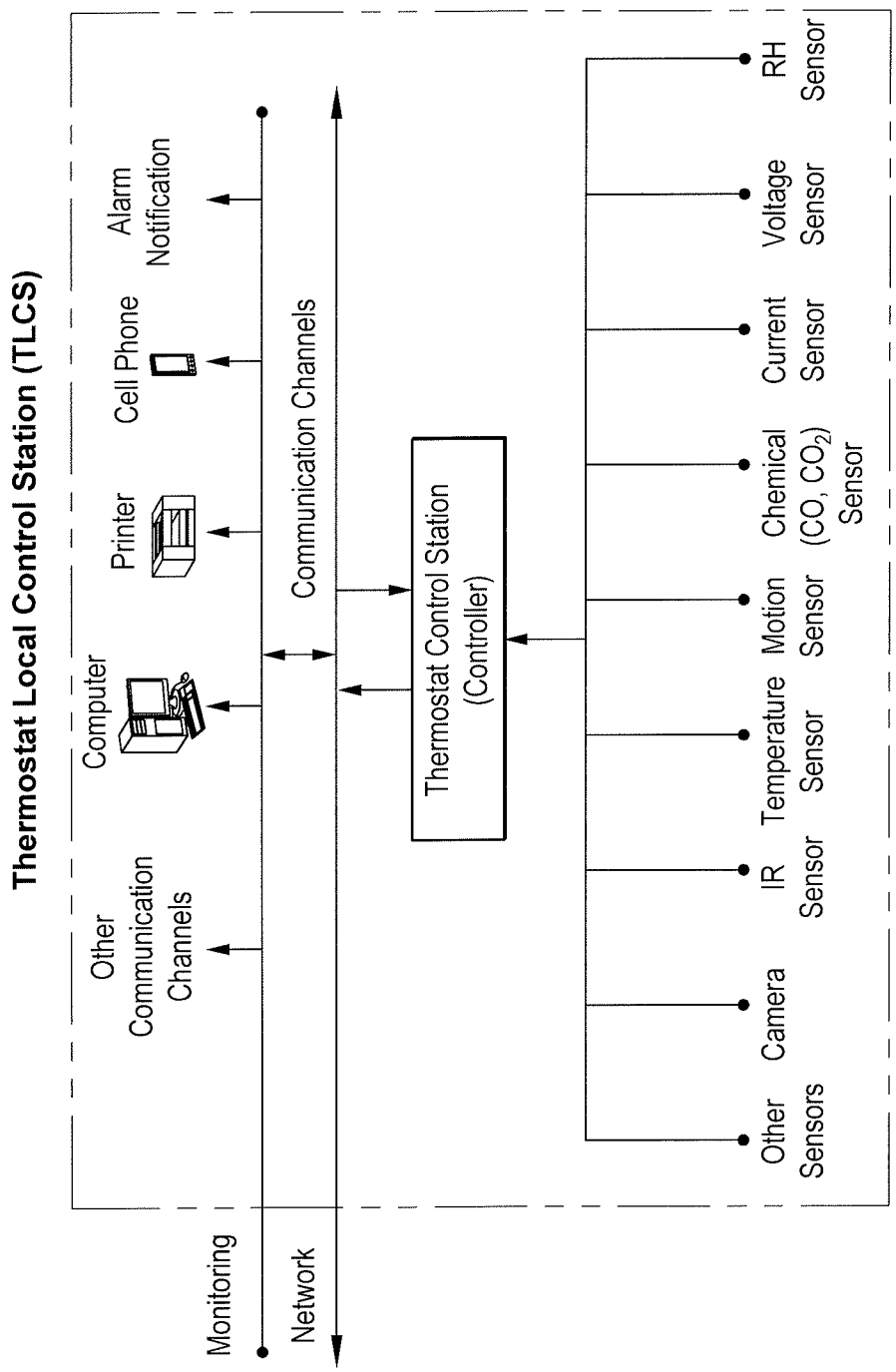
FIG. 2 is a block diagram of a heat index thermostat local control station for a networked heat index thermostat system.
Figure 3:
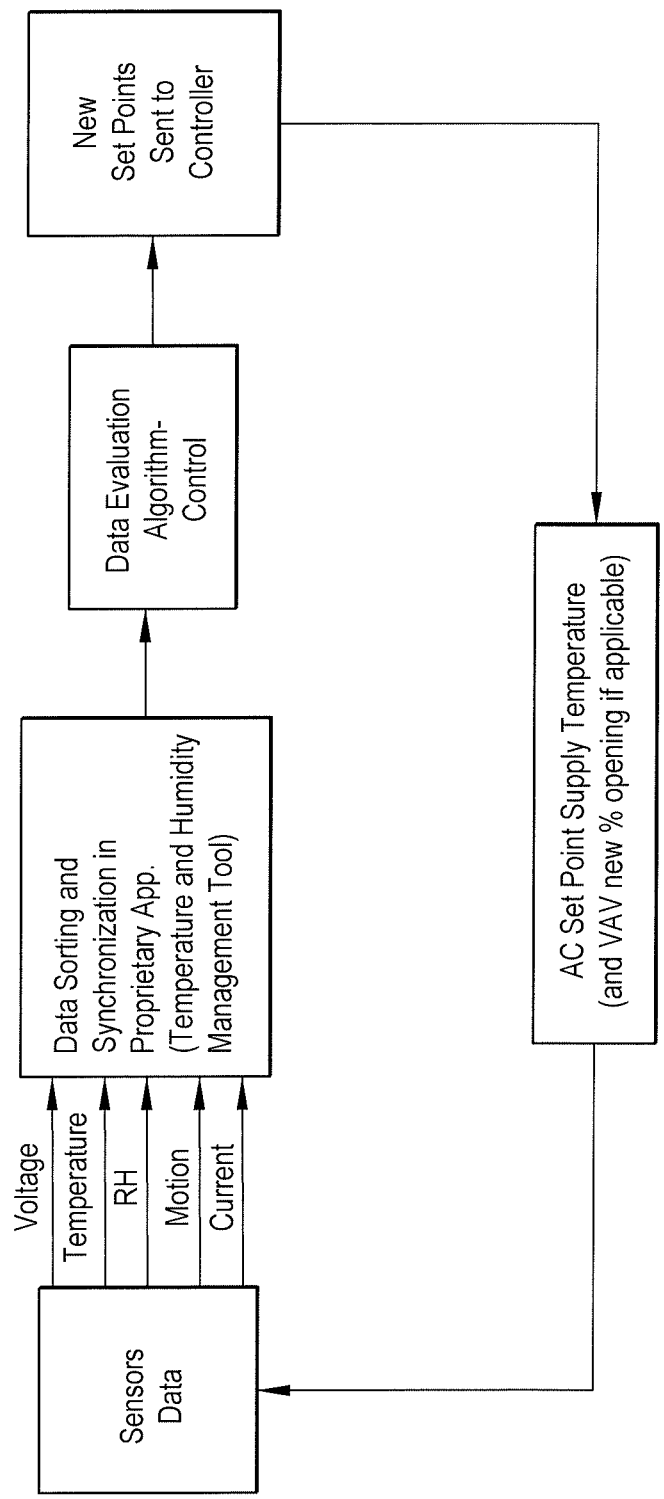
FIG. 3 is a flow diagram in an HVAC system having a heat index thermostat as described herein.

The heat index thermostat may be a smart thermostat adapted for use in a networked system, as shown in FIG. 2. FIG. 3 shows an exemplary flow diagram for data in an HVAC system including the heat index thermostat for sensing, control, and management/adjustment of the heating or cooling system. In particular, the data from the sensors is communicated to the controller, which sorts and synchronizes the data, evaluates the data based on an algorithm, and provides a new temperature setpoint, which is sent to the controller. The controller then communicates the new setpoint to the cooling device or heating device, which is managed or adjusted and valves are adjusted, if necessary. The sensors then collect fresh data based on the adjustments to the cooling device or heating device.

Hardware requirements of the smart thermostat may comprise external and/or internal temperature sensors, external and/or internal realtime humidity sensors, WIFI and/or Internet, memory (to store recent values and additional information), a display, AC power and/or a DC battery powered backup, may be programmable via the Web/Internet for up to one year (day/week/month/year), a blackout dates option, and a dynamic setting for increasing or decreasing the setpoint based on a set range/time. A WIFI connection may be used to monitor the AC operation/space, manage and change temperature setpoints, compare to previous usage and calculate difference, and show operational cost/savings and compare to manufacturer design specifications.

Figure 4:
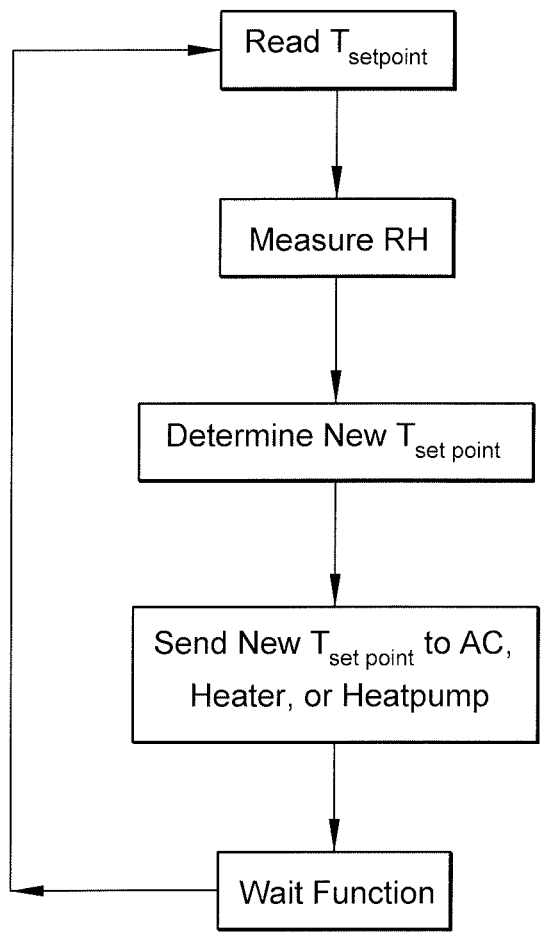
FIG. 4 is a flowchart for a heat index thermostat operating in a heat index mode of operation.

FIG. 4 is a flowchart showing the steps for operation of the heat index thermostat in a heat index mode (also referred to as comfort first operation). In this mode, the temperature set point is selected by the end user. As shown in FIG. 4, the $T_{setpoint}$ is read from memory, and the RH (indoor relative humidity) is measured and input from a sensor. Using the heat index equation lookup table (FIG. 1) in inverse mode, as described above, the new $T_{setpoint}$ (heat index temperature) is calculated, and the new $T_{setpoint}$ is sent to the cooling device or heating device, i.e., the microcontroller sends an actuation signal to the cooling/heating device to turn the device on or off or to manage it by any available means to obtain the indoor temperature required to produce the desired indoor heat index temperature.

Figure 5:
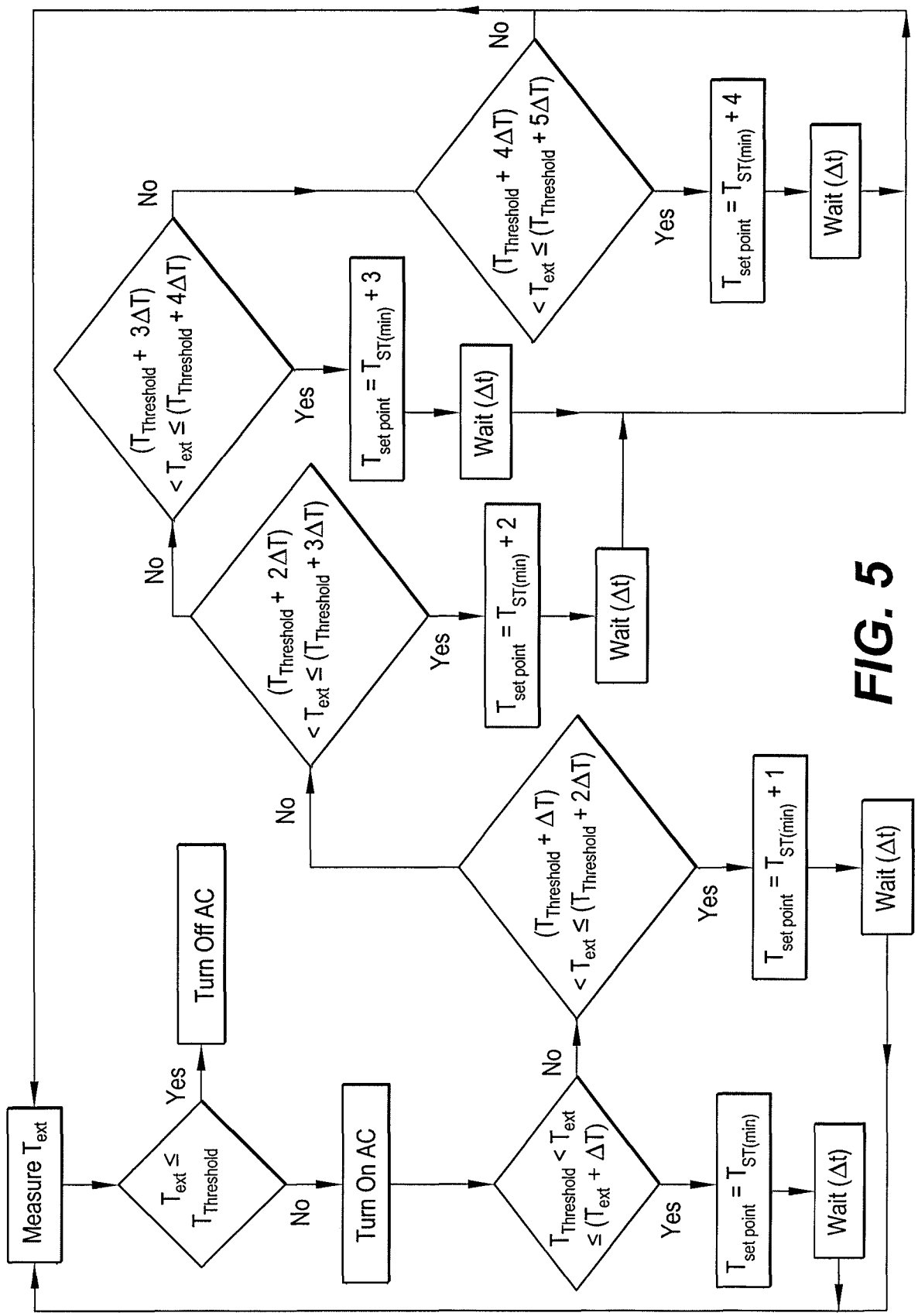
FIG. 5 is a flowchart for a heat index thermostat operating in an external temperature mode of operation.

FIG. 5 is a flowchart showing the steps performed by the heat index thermostat when the user selects operation in the external temperature mode (also referred to as the energy efficient operation mode) through the user interface. As shown in FIG. 5, $T_{Threshold}$ is the maximum external temperature allowed before the heating/cooling device (shown as an air conditioner in FIG. 5) is turned on, $T_{ext}$ is the external temperature, and $T_{ST(min)}$ is the minimum setpoint temperature allowed for the heating/cooling unit. The parameters $T_{Threshold}$ and $T_{ST(min)}$ are used only when the heat index thermostat is used in the fixed energy efficiency mode. Further, the parameters $T_{Threshold}$ and $T_{ST(min)}$ can be determined by a number of factors, including region of the world, local utility regulations, end-user preference, heating/cooling device manufacturer specifications, and type of building, among other factors.

The heating/cooling device is off if $T_{ext} \leq T_{Threshold}$. The heating/cooling device is turned on if $T_{ext} > T_{Threshold}$. When the heating/cooling device is turned on, the temperature setpoint ($T_{setpoint}$) is managed. This relationship can generally be described as:

$$T_{setpoint} = (T_{ST(min)} + j) \text{ when } (T_{Threshold} + j\Delta T) < T_{ext} \leq (T_{Threshold} + (j+1)\Delta T),$$

where j=0, 1, 2, 3, . . . , n. The relationship between $T_{ext}$, $T_{Threshold}$, $T_{setpoint}$, and $\Delta T$ can further be described as:

$$T_{setpoint} = T_{ST(min)} \text{ when } (T_{Threshold}) < T_{ext} \leq (T_{Threshold} + \Delta T);$$

$$T_{setpoint} = (T_{ST(min)} + 1) \text{ when } (T_{Threshold} + \Delta T) < T_{ext} \leq (T_{Threshold} + 2\Delta T);$$

$$T_{setpoint} = (T_{ST(min)} + 2) \text{ when } (T_{Threshold} + 2\Delta T) < T_{ext} \leq (T_{Threshold} + 3\Delta T);$$

$$T_{setpoint} = (T_{ST(min)} + 3) \text{ when } (T_{Threshold} + 3\Delta T) < T_{ext} \leq (T_{Threshold} + 4\Delta T); \text{ and}$$

$$T_{setpoint} = (T_{ST(min)} + 4) \text{ when } (T_{Threshold} + 4\Delta T) < T_{ext} \leq (T_{Threshold} + 5\Delta T).$$

For example, in an exemplary embodiment, an air conditioner is used as the exemplary cooling or heating device, the allowable temperature setpoints are 22-26° C., and the external air temperature ($T_{ext}$) is the control variable. Initially, the external air temperature ($T_{ext}$) is measured by an appropriate sensor, which sends a signal to the heat index thermostat. If $T_{ext}$ is equal to or less than 28° C., the thermostat's microcontroller or microprocessor sends a signal to the driver circuit of the cooling device or heating device to turn off the device. However, if $T_{ext}$ is greater than 28° C., the microcontroller sends an actuation signal to the driver circuit to turn on the AC. In particular, when $T_{ext}$ is greater than 28° C. but equal to or less than 33° C., the $T_{setpoint}$ is 22° C. When $T_{ext}$ is greater than 33° C. but equal to or less than 38° C., the $T_{setpoint}$ is 23° C. When $T_{ext}$ is greater than 38° C. but equal to or less than 43° C., the $T_{setpoint}$ is 24° C. When $T_{ext}$ is greater than 43° C. but equal to or less than 48° C., the $T_{setpoint}$ is 25° C. When $T_{ext}$ is greater than 48° C., the $T_{setpoint}$ is 26° C. The allowable setpoints may be manipulated to desired values, but the configuration of a setpoint in the 22-26° C. range results in energy efficient conditions in the present scenario.

Figure 6:
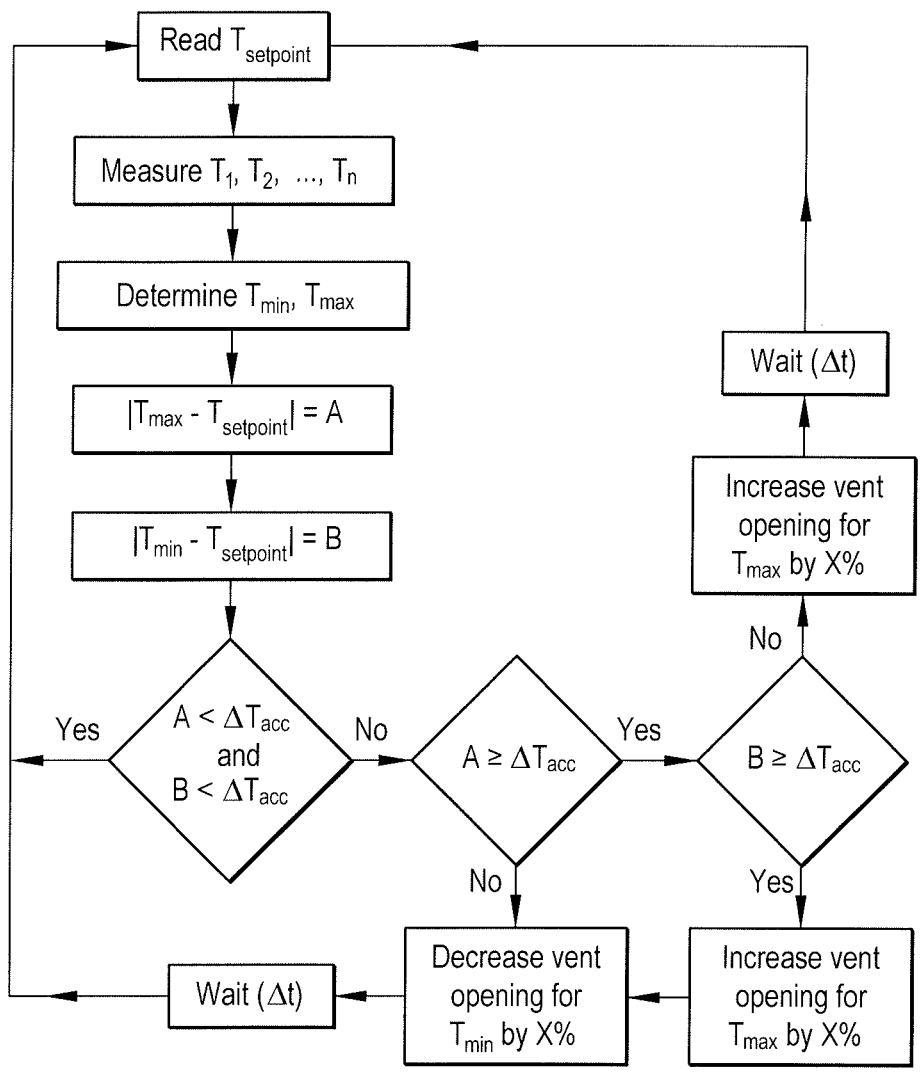
FIG. 6 is a flowchart for a heat index thermostat operating in a temperature distribution mode of operation

FIG. 6 is a flowchart showing the steps performed by the heat index thermostat when the user selects operation in the multi-space temperature equalization mode, which uses the present heat index thermostat to control air vents in the spaces or zones, for example, of a multi-room building. The flowchart is based on the assumption that the cooling/heating device is an air conditioner, the flowchart for a heater being similar, but with the direction of adjustment of the vent opening being reversed.

The space to be temperature-controlled may be divided into zones, which may have n number of air vents (one per space or zone), n number of temperature sensors (one per space or zone), and one motion sensor per space or zone. The air vents are controllable, e.g., by servo motors or step motors that control rotation of a vent door across the air duct at the vent. The percentage of opening for the air vents is adjustable, with the default setting for the vents at 50% open.

In this mode, the thermostat's microcontroller or microprocessor reads the temperature setpoint ($T_{setpoint}$) set by the user using the user interface from memory. The thermostat receives signals from remote temperature sensors positioned in each of the spaces or rooms, and either calculates the temperatures $\{(T_1, T_2, \ldots, T_n\}$ or simply stores the temperatures calculated by the sensors (depending upon the capability of the temperature sensors) in memory. The microcontroller computes the maximum temperature ($T_{max}$) and the minimum temperature ($T_{min}$) among the temperatures $\{T_1, T_2, \ldots, T_n\}$, and then determines the differential between the maximum temperature and the temperature setpoint $A = T_{max} - T_{setpoint}$, and the differential between the minimum temperature and the temperature setpoint $B = T_{min} - T_{setpoint}$.

If the magnitude or absolute value of the differentials A and B are both less than an acceptable temperature difference ($\Delta T_{acc}$), this is within the allowed specifications, and the process will start over by measuring the temperatures for each space or room at a predetermined sampling frequency. In an exemplary embodiment, $\Delta T_{acc}$ is 2° C.

However, if A is greater than or equal to $\Delta T_{acc}$ and B is greater than or equal to $\Delta T_{acc}$, the vent associated with $T_{max}$ is identified and the associated vent opening is increased by X % by the microcontroller sending a suitable actuating signal to the driver circuit for the vent's servo or step motor. This allows more cool air to enter the space or room having the maximum temperature, lowering the temperature towards the desired set point and helping to equalize temperatures in the spaces. X % is defined based on a number of factors such as region, type and size of the heating/cooling device and system, and end-user and manufacturer specifications. For example, in some embodiments, X % may be 10%. Then the vent associated with $T_{min}$ is identified and the associated vent opening is decreased by X % by the microcontroller sending a suitable actuating signal to the driver circuit for the vent's servo or step motor. This allows less cool air to enter the space or room having the minimum temperature, raising the temperature towards the desired set point and helping to equalize temperatures in the spaces. A wait function is then implemented before starting the process over by reading $T_{setpoint}$.

However, if A is greater than or equal to $\Delta T_{acc}$ and B is not greater than or equal to $\Delta T_{acc}$, this means that $T_{max}$ is more than $\Delta T_{acc}$, and the vent opening is increased by X %, but no adjustment is made in the vent opening for the $T_{min}$ space. This allows more cool air to enter the space or room having the maximum temperature, lowering the temperature towards the desired set point and helping to equalize temperatures in the spaces. A wait function is then implemented before starting the process over by reading $T_{setpoint}$.

If the magnitude of A is not greater than or equal to $\Delta T_{acc}$, then $T_{min}$ is more than $\Delta T_{acc}$. In this case, the vent associated with $T_{min}$ is identified and the associated vent opening is decreased by X % by the microcontroller sending a suitable actuating signal to the driver circuit for the vent's servo or step motor. A wait function is then implemented before starting the process over by reading $T_{setpoint}$. This allows less air conditioning into the space or room associated with $T_{min}$, allowing the space to warm towards the set point.

This process may be repeated, if necessary, at a predetermined sampling frequency. Optionally, if temperature equalization cannot be achieved, the temperature setpoint ($T_{setpoint}$) may be decreased by a desired increment, such as 1° C., and the steps in FIG. 6 may be repeated. Finally, if the thermostat is still not able to equalize the temperature in the multi-space system, maintenance should be called.

The process for equalizing temperatures in a multi-space environment when the cooling/heating device is a heater is similar, but the direction of vent opening is reversed. If the cooling/heating device is a heat pump, which may operate in either a heating or air conditioning mode, the process is also similar, but the vent opening is always increased in X % increments when an adjustment is needed, and the microcontroller also outputs a signal switching the heat pump to air conditioning or heating mode, depending upon whether the adjustment to equalize temperatures requires heating or cooling. It will be understood that changing the temperature in a space or room may require an appreciable interval of time after the microcontroller signals an increase or decrease in the vent opening, so that the sampling interval for measuring the temperatures $\{T_1, T_2, \ldots, T_n\}$ may be several minutes, or even one or more hours, depending upon the size of the space and the efficiency of the cooling/heating device.

It is to be understood that the present subject matter is not limited to the embodiments described above, but encompasses any and all embodiments within the scope of the following claims.

I claim:

1. A heat index thermostat, comprising:
    a microcontroller having a plurality of input terminals including at least an input terminal adapted for receiving a signal from an indoor temperature sensor, an input terminal adapted for receiving a signal from an indoor relative humidity sensor, and an output terminal adapted for actuating a heating/cooling device, wherein the microcontroller further comprises an input terminal adapted for receiving a signal from an external temperature sensor;
    a user interface connected to the microcontroller, the user interface having means for entering a temperature into the microcontroller for regulating indoor temperature in a space to be temperature regulated;
    memory connected to the microcontroller;
    means stored in the memory for providing a heat index temperature corresponding to temperature and indoor humidity, the means including a heat index lookup table;
    software stored in the memory and executable by the microcontroller, the software including:
    i) means for shutting off the heating/cooling device when the signal from the external temperature sensor ($T_{ext}$) is less than or equal to a maximum external temperature before the heating/cooling device is turned on ($T_{Threshold}$);
    ii) means for sending an actuating signal to the output terminal to actuate the heating/cooling device to obtain and thermostatically maintain an indoor temperature of ($T_{ST(min)}$) when the signal from the external temperature sensor is greater than $T_{Threshold}$ and less than or equal to a sum of $T_{Threshold}$ and a change in temperature $\Delta T$ ($T_{Threshold} + \Delta T$);
    iii) means for sending an actuating signal to the output terminal to actuate the heating/cooling device to obtain and thermostatically maintain an indoor temperature of $(T_{ST(min)}+1)$ when the signal from the external temperature sensor is greater than $(T_{Threshold}+\Delta T)$ and less than or equal to a sum of $T_{Threshold}$ and two times the change in temperature $\Delta T$ $(T_{Threshold}+2\Delta T)$;

iv) means for sending an actuating signal to the output terminal to actuate the heating/cooling device to obtain and thermostatically maintain an indoor temperature of $(T_{ST(min)}+1)$ when the signal from the external temperature sensor is greater than $(T_{Threshold}+\Delta T)$ and less than or equal to a sum of $T_{Threshold}$ and two times the change in temperature $\Delta T$ $(T_{Threshold}+2\Delta T)$;

v) means for sending an actuating signal to the output terminal to actuate the heating/cooling device to obtain and thermostatically maintain an indoor temperature of $(T_{ST(min)}+3)$ when the signal from the external temperature sensor is greater than $(T_{Threshold}+3\Delta T)$ and less than or equal to a sum of $T_{Threshold}$ and four times the change in temperature $\Delta T$ $(T_{Threshold}+4\Delta T)$; and vi) means for sending an actuating signal to the output terminal to actuate the heating/cooling device to obtain and thermostatically maintain an indoor temperature of $(T_{ST(min)}+4)$ when the signal from the external temperature sensor is greater than $(T_{Threshold}+4\Delta T)$ and less than or equal to a sum of $T_{Threshold}$ and five times the change in temperature $\Delta T$ $(T_{Threshold}+5\Delta T)$;

vii) means for using the heat index lookup table to determine an indoor temperature required to produce an indoor heat index temperature equal to the temperature entered into the user interface given an indoor relative humidity signal from the indoor relative humidity sensor;

viii) means for sending an actuating signal to the output terminal to actuate the heating/cooling device to obtain the indoor temperature determined from the lookup table;

ix) means for thermostatically monitoring the signal from the indoor temperature sensor and actuating the heating/cooling device to maintain the indoor temperature determined from the lookup table; and x) means for using the heat index lookup table to determine the indoor heat index temperature given the signals from the indoor relative humidity and indoor temperature sensors, and for thermostatically actuating the heating/cooling device to maintain the indoor heat index equal to the temperature entered into the user interface.

2. The heat index thermostat according to claim 1, wherein said user interface further comprises means for selecting a mode of operation.

3. The heat index thermostat according to claim 2, wherein said mode of operation comprises a heat index mode of operation.

4. The heat index thermostat according to claim 2, wherein said mode of operation comprises an external temperature mode of operation.

5. The heat index thermostat according to claim 2, wherein said mode of operation comprises a multi-space temperature equalization mode of operation.

6. The heat index thermostat according to claim 5, wherein said microcontroller further comprises:

an input terminal adapted for receiving a signals from a plurality of indoor temperature sensors disposed in a plurality of spaces in a structure; and software stored in the memory and executable by the microcontroller, the software including:

means for determining the maximum and minimum temperatures from the indoor temperature sensors;

means for determining a first differential between the maximum temperature and a set point temperature entered into the user interface;

means for determining a second differential between the minimum temperature and the set point temperature;

means for thermostatically maintaining temperatures in the multiples spaces when the first and second differentials are within a prescribed interval of the set point temperature;

means for increasing or decreasing vent space openings in the space having the maximum temperature when the first differential is at least the prescribed interval away from the set point temperature;

means for increasing or decreasing vent space openings in the space having the minimum temperature when the second differential is at least the prescribed interval away from the set point temperature; and mean for sampling temperatures in the plurality of spaces and adjusting the vent space openings at regular intervals until temperatures in the plurality of spaces are within the prescribed interval of each other.

7. A thermostatic control station, comprising:
a heat index thermostat according to claim 1;
a plurality of sensors connected to said microcontroller; and
means for connecting said microcontroller to a network.

8. The thermostatic control station according to claim 7, wherein said plurality of sensors are selected from the group consisting of a camera, an infrared sensor, a temperature sensor, a motion sensor, a chemical sensor, an electrical current sensor, a voltage sensor, and a relative humidity sensor.

9. The thermostatic control station according to claim 7, wherein said network comprises a WiFi network.

10. The thermostatic control station according to claim 9, wherein said user interface comprises a remote access user interface connected to said microcontroller through the network, whereby the heat index thermostat may be remotely controlled.

11. A method of regulating temperature in an enclosed space using indoor heat index temperature, comprising the steps of:

entering a desired indoor temperature into a thermostat;

receiving a signal from a relative humidity sensor disposed in the enclosed space at the thermostat;

receiving a signal from a temperature sensor disposed in the enclosed space at the thermostat;

looking up a temperature required to produce a heat index temperature equal to the desired indoor temperature given the signal from the relative humidity sensor from a table in memory in the thermostat;

sending an actuating signal to a heating/cooling device to adjust indoor temperature in the enclosed space to the temperature obtained in the looking up step;

thermostatically monitoring signals from the temperature sensor to obtain and maintain the indoor temperature required to produce the heat index temperature equal to the desired indoor temperature;

providing a heat index thermostat, the heat index thermostat including:

a microcontroller having a plurality of input terminals including at least an input terminal adapted for receiving a signal from an indoor temperature sensor, an input terminal adapted for receiving a signal from an indoor relative humidity sensor, and an output terminal adapted for actuating a heating/cooling device, wherein the microcontroller further comprises an input terminal adapted for receiving a signal from an external temperature sensor, wherein the microcontroller further comprises:

i) means for shutting off the heating/cooling device when the signal from the external temperature sensor ($T_{ext}$) is less than or equal to a maximum external temperature before the heating/cooling device is turned on ($T_{Threshold}$);

ii) means for sending an actuating signal to the output terminal to actuate the heating/cooling device to obtain and thermostatically maintain an indoor temperature of ($T_{ST(min)}$) when the signal from the external temperature sensor is greater than $T_{Threshold}$ and less than or equal to a sum of $T_{Threshold}$ and a change in temperature $\Delta T$ ($T_{Threshold}+\Delta T$);

iii) means for sending an actuating signal to the output terminal to actuate the heating/cooling device to obtain and thermostatically maintain an indoor temperature of ($T_{ST(min)}+1$) when the signal from the external temperature sensor is greater than ($T_{Threshold}+\Delta T$) and less than or equal to a sum of $T_{Threshold}$ and two times the change in temperature $\Delta T$ ($T_{Threshold}+2\Delta T$);

iv) means for sending an actuating signal to the output terminal to actuate the heating/cooling device to obtain and thermostatically maintain an indoor temperature of ($T_{ST(min)}+1$) when the signal from the external temperature sensor is greater than ($T_{Threshold}+\Delta T$) and less than or equal to a sum of $T_{Threshold}$ and two times the change in temperature $\Delta T$ ($T_{Threshold}+2\Delta T$);

v) means for sending an actuating signal to the output terminal to actuate the heating/cooling device to obtain and thermostatically maintain an indoor temperature of ($T_{ST(min)}+3$) when the signal from the external temperature sensor is greater than ($T_{Threshold}+3\Delta T$) and less than or equal to a sum of $T_{Threshold}$ and four times the change in temperature $\Delta T$ ($T_{Threshold}+4\Delta T$); and vi) means for sending an actuating signal to the output terminal to actuate the heating/cooling device to obtain and thermostatically maintain an indoor temperature of ($T_{ST(min)}+4$) when the signal from the external temperature sensor is greater than ($T_{Threshold}+4\Delta T$) and less than or equal to a sum of $T_{Threshold}$ and five times the change in temperature $\Delta T$ ($T_{Threshold}+5\Delta T$).

12. The method of regulating temperature according to claim 11, wherein the table in the looking up step comprises a table implementing a heat index equation.

13. The method of regulating temperature according to claim 11, further comprising the steps of continuously monitoring the indoor heat index temperature using the indoor temperature and indoor relative humidity sensors and comparing the indoor heat index temperature to the desired indoor temperature entered into the thermostat.

14. The method of regulating temperature according to claim 13, further comprising the steps of recomputing the temperature required to produce the heat index temperature equal to the desired indoor temperature and actuating the heating/cooling device to obtain the recomputed temperature.

* * * * *